C. H. YOUNG.
STEERING MECHANISM FOR MOTOR OPERATED VEHICLES.
APPLICATION FILED FEB. 3, 1919.
1,352,572.
Patented Sept. 14, 1920.
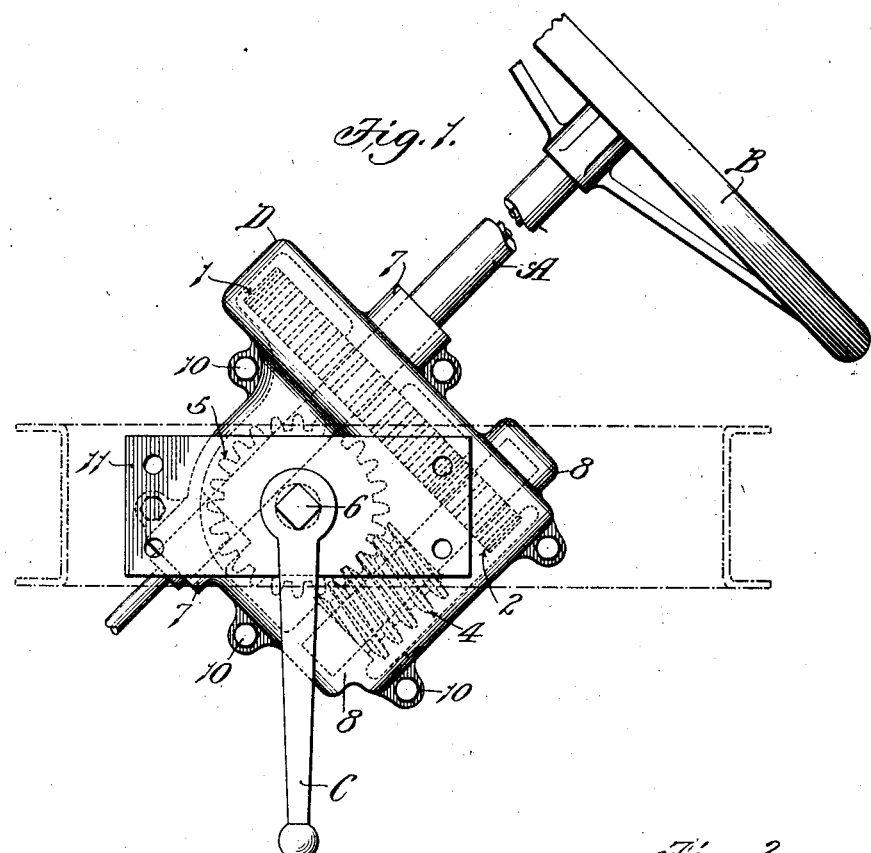
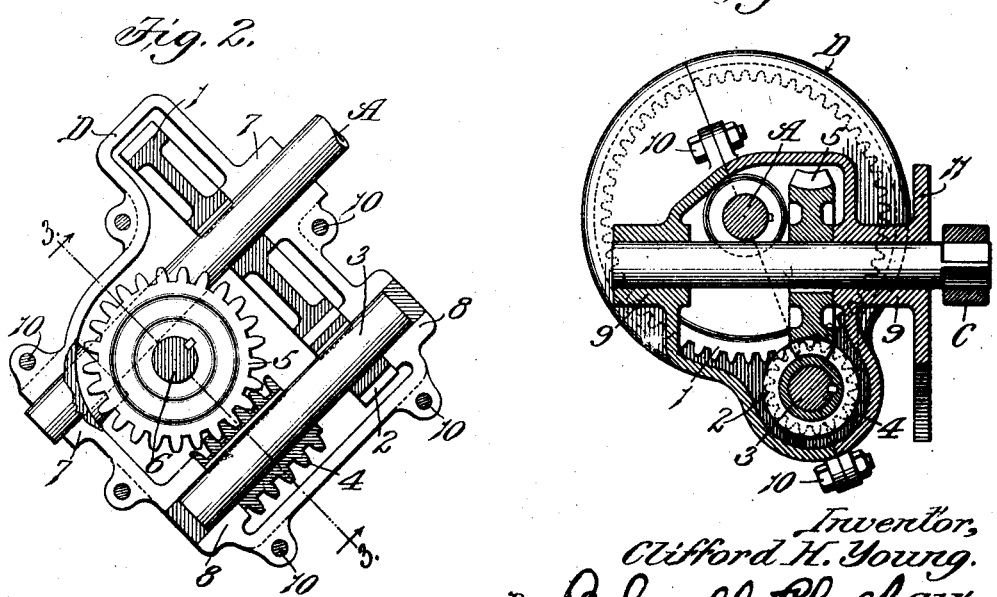
Inventor,
Clifford H. Young.
By Bakewell Church attys.

UNITED STATES PATENT OFFICE.

CLIFFORD H. YOUNG, OF ST. LOUIS, MISSOURI, ASSIGNOR TO THE AUTO & MOTOR TRUCK AXLE COMPANY, A CORPORATION OF DELAWARE.

STEERING MECHANISM FOR MOTOR-OPERATED VEHICLES.

1,352,572.        Specification of Letters Patent.        Patented Sept. 14, 1920.

Application filed February 3, 1919. Serial No. 274,755.

*To all whom it may concern:*

Be it known that I, CLIFFORD H. YOUNG, a citizen of the United States, residing at St. Louis, Missouri, have invented a certain new and useful Improvement in Steering Mechanisms for Motor-Operated Vehicles, of which the following is a full, clear, and exact description, such as will enable others skilled in the art to which it appertains to make and use the same.

This invention relates to steering mechanisms for automobiles and motor trucks.

One type of steering mechanism that is now used extensively on motor-operated vehicles is so constructed that a relatively slight movement of the steering wheel is sufficient to turn the front wheels of the vehicle the required distance to guide the vehicle properly. This is a very desirable feature in that it enables the front wheels to be turned quickly and without the necessity of imparting one or more complete revolutions to the steering wheel when the front wheels are being turned the maximum distance. This type of steering mechanism, however, has a very objectionable characteristic, namely, it necessitates the operator keeping one or both of his hands on the steering wheel at all times, owing to the fact that a rut, stone or any slight obstruction in the road causes the front wheels of the vehicle to turn, and thus change the path of travel of the vehicle. Another type of steering mechanism that is also used extensively on motor-operated vehicles is so constructed that it normally holds the front wheels in such a position that a rut or other slight obstruction in the road will not cause the front wheels to turn from the path in which they are traveling, but this later type has the disadvantage of requiring a relatively great movement of the steering wheel in order to effect a slight change in the position of the front wheels, it being necessary to impart several complete turns to the steering wheel in order to move the front wheels their maximum distance.

The object of my invention is to provide a steering mechanism for motor-operated vehicles that has the good features but none of the objectionable features of both of the types of steering mechanisms previously referred to. To this end I have devised a steering mechanism in which the front wheels of the vehicle are normally locked or held against accidental movement to the right or left, but are capable of being turned sufficiently to guide the vehicle by a slight movement of the steering wheel, it being possible to turn the front wheels their maximum distance by turning the steering wheel less than one complete revolution.

Figure 1 of the drawings is a side elevational view of a steering mechanism constructed in accordance with my invention.

Fig. 2 is a vertical sectional view of a portion of said mechanism; and

Fig. 3 is a transverse sectional view, taken on the line 3—3 of Fig. 2.

Referring to the drawings which illustrate the preferred form of my invention, A designates the steering shaft of a motor-operated vehicle, B a steering wheel, herein shown as rigidly connected to the upper end of said steering shaft and C the usual rock arm which controls the position of the front wheels of the vehicle, said rock arm being connected by a rod, not shown, to the front wheels of the vehicle so as to cause said front wheels to turn to the right when the arm C rocks in one direction and to turn to the left when said arm rocks in the opposite direction.

My broad idea consists in operating the rock arm C by means of a worm and worm gear constructed in such a manner that said rock arm will be normally locked or held against accidental movement, and transmitting movement from the steering wheel B to said operating means by a gear and pinion arranged in such a manner that the rock arm C can be moved its maximum distance by turning the steering wheel less than a complete revolution. In the form of my invention herein shown the steering wheel B is rigidly connected to the steering shaft A and a gear, pinion and sub-shaft are used to transmit movement from said steering shaft to the worm which forms part of the combined operating and locking means for the rock arm C, but I do not wish it to be understood that my invention is limited to a steering mechanism of the particular construction herein shown, as various other means or a substantially similar means arranged in a different manner can be employed for transmitting movement from the steering wheel to said worm without departing from the spirit of my invention, so long as said means is so constructed that a relatively slight movement of the steering wheel, for example, less than a complete revolution, will be sufficient to turn the front wheels of the vehicle their maximum distance. In the mechanism herein shown the means for transmitting movement from the steering shaft A to the rock arm C consists of a gear 1 on the steering shaft, a pinion 2 that meshes with said gear, a sub-shaft 3 to which the pinion 2 is rigidly connected, a worm 4 rigidly mounted on the shaft 3, and a worm gear 5 rigidly mounted on the cross shaft 6 to which the rock arm C is rigidly connected. Due to the fact that the steering shaft A and shaft 3 are connected together by the relatively large gear 1 on the steering shaft and the pinion 2 on the sub-shaft 3, a slight rotary movement of the steering wheel will move the rock arm C its maximum distance. Consequently, the front wheels of the vehicle can be turned quickly by simply turning the steering wheel a slight distance in the proper direction. Furthermore, the front wheels of the vehicle are securely locked at all times and held against accidental movement, due to the fact that a worm 4 and worm gear 5 are used to transmit movement from the shaft 3 to the cross shaft 6 on which the rock arm C is mounted.

It is immaterial, so far as my broad idea is concerned, how the parts previously referred to are mounted, but I prefer to inclose said gears, pinion and worm in a housing D which is provided with bearings 7 for the steering shaft, bearings 8 for the sub-shaft 3 and bearings 9 for the cross shaft 6. Said housing is preferably split vertically on a diagonal line, as shown in Fig. 3 and the two parts or halves of same are connected together by bolts or other suitable fastening devices 10, one part of said housing being preferably integrally connected to a plate 11 which is adapted to be bolted or connected in any other preferred manner to one of the side sills of the chassis of the vehicle, as shown in Fig. 1.

Having thus described my invention, what I claim and desire to secure by Letters Patent is:

A steering mechanism for motor-operated vehicles, comprising an inclined steering shaft, a split housing on the frame of the vehicle equipped with a bearing for said steering shaft, a horizontally-disposed shaft in said housing arranged at right angles to said steering shaft and provided at its outer end with a rock arm that controls the position of the front wheels of the vehicle, a worm gear on said horizontal shaft, a subshaft journaled in said housing and arranged parallel to said steering shaft, a worm on said subshaft that meshes with the worm gear on said horizontal shaft, a straight faced gear on said steering shaft and a pinion on said subshaft that meshes with said straight faced gear.

CLIFFORD H. YOUNG.